United States Patent [19]

Turturici

[11] 4,106,081

[45] Aug. 8, 1978

[54] DETACHABLE LAMP ASSEMBLY FOR DUAL TRAILER TRUCKS

[76] Inventor: Gaeton Ben Turturici, 6130 Monterey Rd., San Jose, Calif. 95111

[21] Appl. No.: 807,877

[22] Filed: Jun. 20, 1977

[51] Int. Cl.² ............................................. B60Q 1/00
[52] U.S. Cl. ...................................... 362/61; 362/82; 362/226
[58] Field of Search ........................... 362/61, 82, 226

[56] References Cited

U.S. PATENT DOCUMENTS 3,803,396  4/1974  Damico .............................. 240/2 W Primary Examiner—Stephen J. Lechert, Jr.
Attorney, Agent, or Firm—Jack M. Wiseman

[57] ABSTRACT

A detachable lamp assembly for temporary installation in the existing electrical socket at the rear of the first trailer in a dual-trailer truck coupled to a tractor cab. The lamp assembly is energized when the headlamps of the tractor are lighted, and illuminates the forward end of the second trailer for coupling and uncoupling the first and second trailer in the usual low-level light conditions at night in trucking yards. Thus utilized, the lamp assembly is a useful aid in preventing breakage or damage of the vulnerable air connectors, and other adjacent parts, which damage commonly occurs when the driver cannot visually monitor the coupling or uncoupling operation.

20 Claims, 8 Drawing Figures

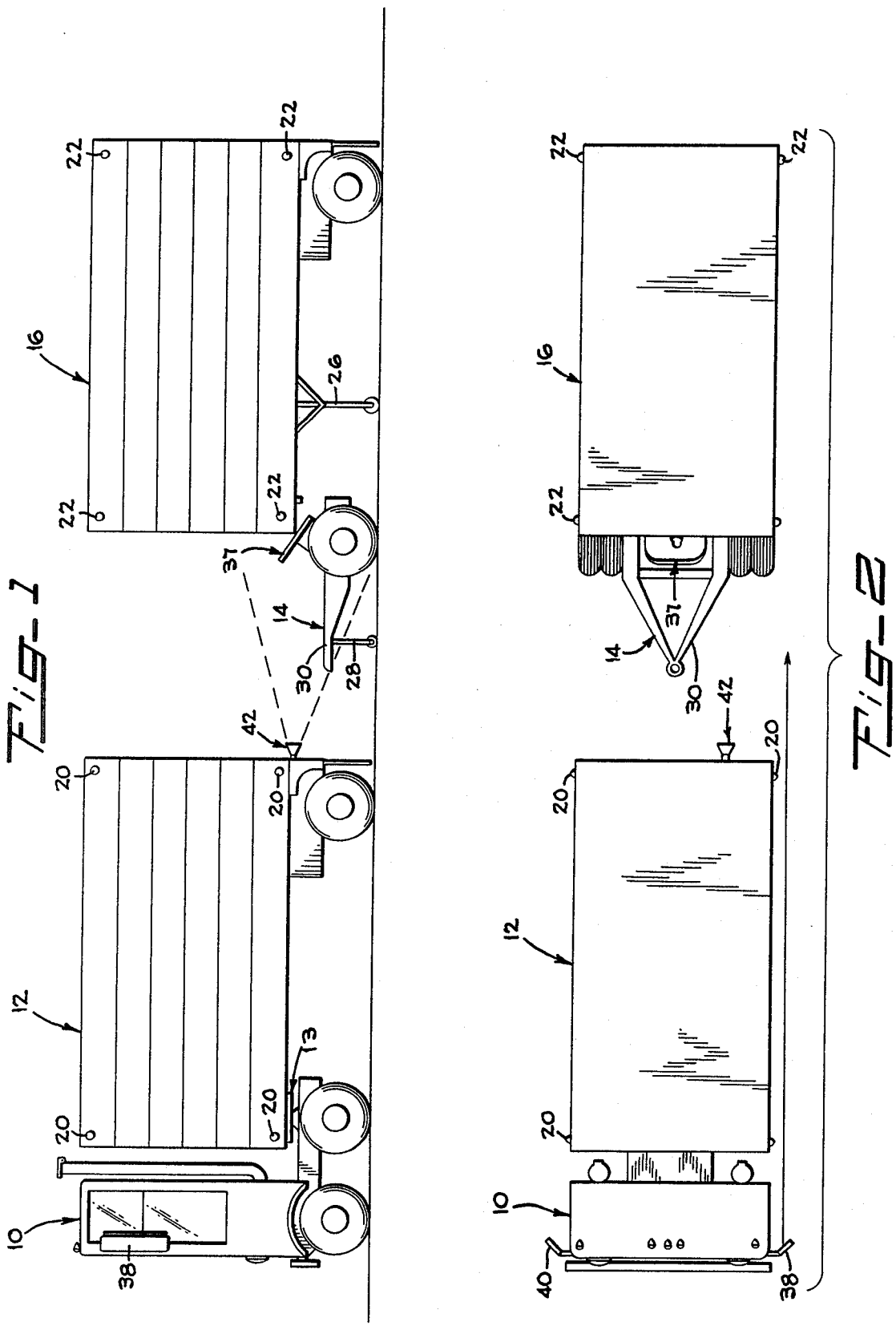

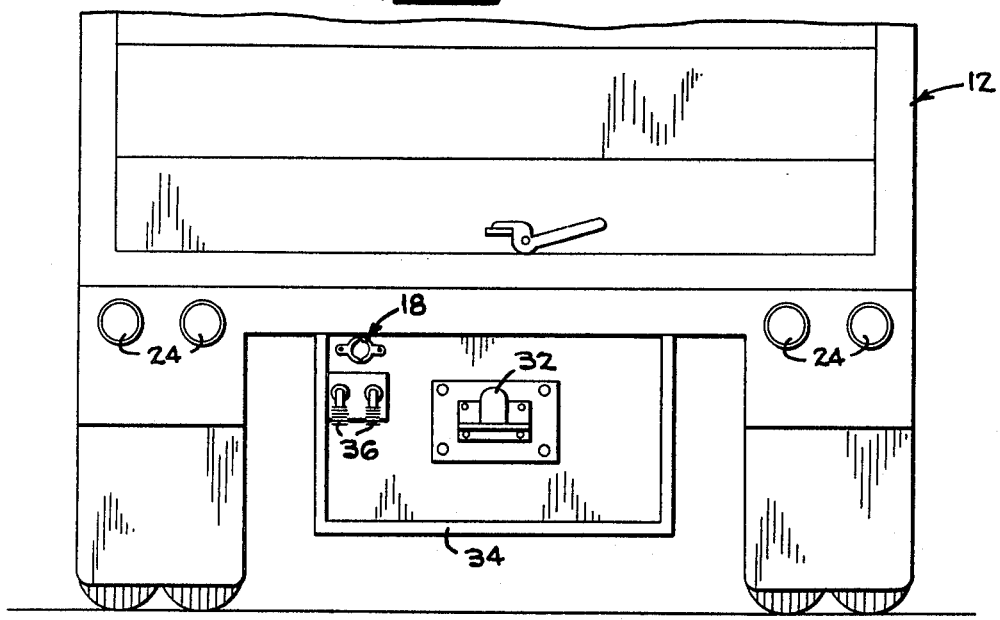
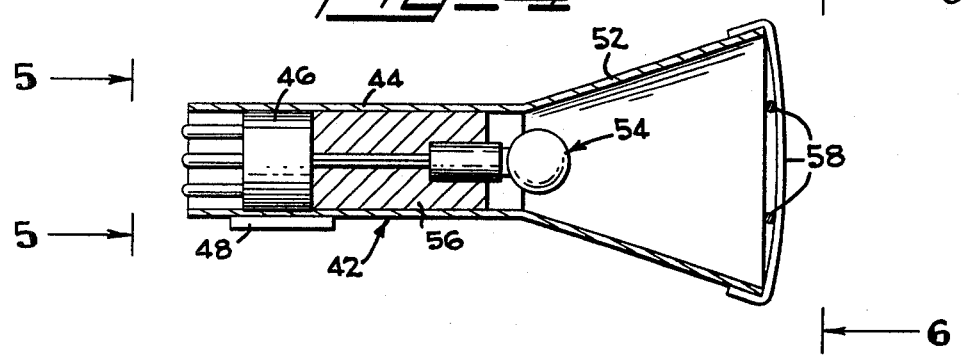
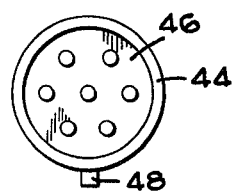
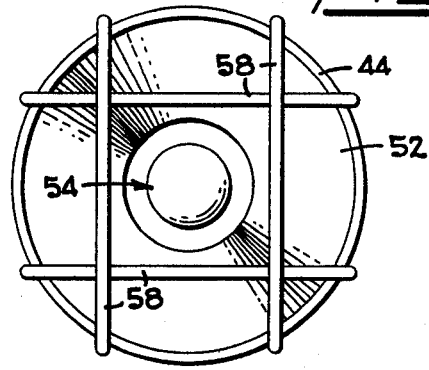

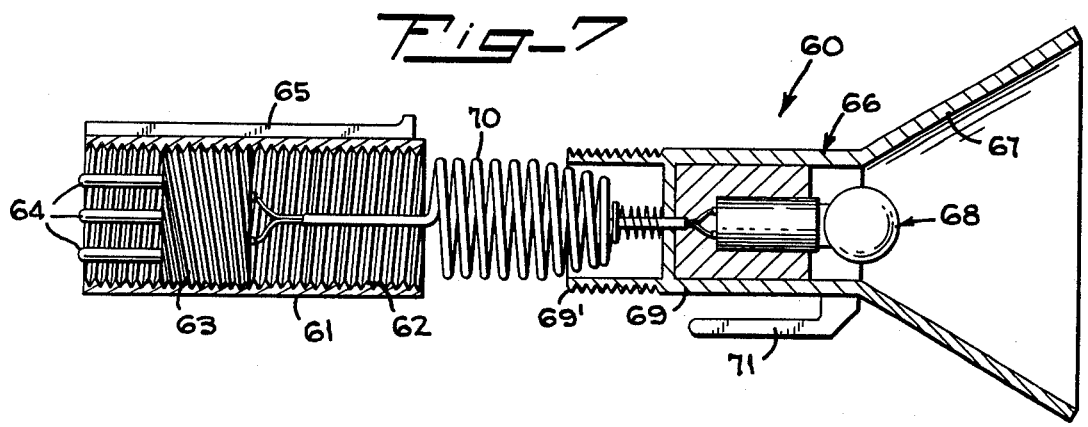
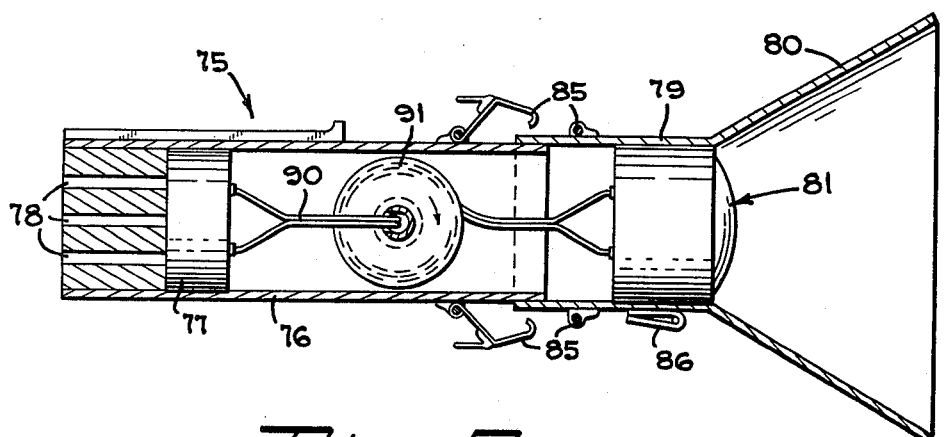

DETACHABLE LAMP ASSEMBLY FOR DUAL TRAILER TRUCKS

DESCRIPTION OF THE PRIOR ART

Detachable clearance lights for trucks are disclosed in the following U.S. Pats. Fraser, No. 2,069,238, Feb. 2, 1937; Fraser, No. 2,076,020, Apr. 6, 1937; Wordeu, No. 2,806,940, Sept. 17, 1957; Baldwin, No. 2,853,595, Sept. 23, 1958; and Baldwin, No. 3,008,039, Nov. 7, 1961. In general, each of these patents is directed to the specific detailed construction of a clearance light which may readily be replaced without tools or complex mounting hardware. None of these patents is concerned with the problem of providing illumination of the coupling area between dual trailers. The present invention employs existing and universally uniform electric components of all dual trailers, and a demountable auxiliary lamp assembly cooperatively associated with such components for the illumination of the coupling area between dual trailers.

BACKGROUND OF THE INVENTION

In coupling or uncoupling operations with a tractor cab and dual trailers, accurate longitudinal alignment of the first and second trailers and the fifth wheel dolly positioned between the trailers is essential to prevent damage to certain vulnerable components situated near the coupling area. Needless to say, any required repair following such damage interrupts the normal routine of the maintenance mechanics, and causes inevitable delay to the shipment. It is also apparent that any reduction in the necessary time for coupling the trailer will maximize the road time for the tractor-trailer vehicle. This is a clear advantage to the owners, whose mechanics might otherwise be called off major repair work.

In dimly lit truck yards, the usual practice among truck drivers of using the brake lights of the semitrailer and/or the flashing turn signals of the semitrailer is totally inadequate to always assure rapid and effective coupling to a fifth wheel dolly and second trailer. The present invention enables quick, safe and easy coupling operations in inadequately lit truck yards.

SUMMARY OF THE INVENTION

A conventional tractor and semitrailer combination equipped to tow a second trailer and its dolly is provided with an electrical socket at the rear of the semitrailer for coupling to an electrical plug of the second trailer. This electrical socket transfers electrical power to the second trailer for lighting the clearance lights, turn signals, license plate light and other electrical equipment from the power supplied by the tractor cab. Further, the electrical socket on the rear of the semitrailer is universally uniform among all makes of semitrailers. The present invention provides a readily mounted auxiliary lamp assembly which plugs into the electrical socket of the semitrailer. When the headlights of the tractor are lighted, electrical power is delivered to the electrical socket of the semitrailer to light the auxiliary lamp assembly. By this means, the frontal area of the second trailer is fully lighted, and the driver can easily visually check the longitudinal alignment of the semitrailer with the tires of the dolly and the sides of the second trailer from his rear view mirrors. Thus, an efficient, safe and quick coupling is provided in spite of dimly lighted conditions.

BRIEF DESCRIPTION OF THE DRAWINGS

FIG. 1 is a diagrammatic side elevation view of a tractor cab and dual trailer ready for a coupling of the rearmost trailer.

FIG. 2 is a diagrammatic plan view of the truck components shown in FIG. 1.

FIG. 3 is an enlarged fragmentary end elevation of the semitrailer shown in FIG. 1.

FIG. 4 is a longitudinal section view through the auxiliary lamp assembly embodying the present invention.

FIGS. 5 and 6 are end elevations of opposite ends of the lamp assembly shown in FIG. 4.

FIG. 7 is a longitudinal section view of a modification of the auxiliary lamp assembly shown in FIG. 4.

FIG. 8 is a longitudinal section view of a further modification of the auxiliary lamp assembly shown in FIG. 4.

DESCRIPTION OF THE PREFERRED EMBODIMENTS

Illustrated in FIGS. 1 and 2 is a conventional truck tractor 10 in coupled relation with a semitrailer 12 by means of a fifth wheel connection 13. The semitrailer 12 is of the type that includes means for coupling the semitrailer to a fifth wheel dolly 14, which supports the leading end of a second trailer 16. It is conventional for an electrical socket 18 (FIG. 3) to be provided for conducting electrical power from the tractor 10 to the second trailer 16. The electrical connectors to the electrical socket 18 supply electrical power for lighting clearance lights 20 of the semitrailer and for lighting similar clearance lights 22 on the second trailer. In addition, the electrical connectors supply electrical power to the license plate lights, not shown, and turn signal and brake lights at 24. Since the trailers 12 and 16 are interchangeable, it is apparent that the rear end of the second trailer 16 also has an electrical socket as described for the trailer 12 and also includes brake, turn signal and license lights.

While there are different optional coupling procedures which may be followed, a set of trailers, as shown in FIGS. 1 and 2, may be coupled by positioning the fifth wheel dolly 14 in longitudinal alignment with the front end of the second trailer 16. The trailer 16 and the dolly 14 are respectively temporarily supported by their struts 26 and 28. The tractor 10 with the trailer 12 coupled thereto is then backed toward the dolly 14 in fairly precise longitudinal alignment therewith so that a tongue 30 on the dolly 14 will engage a mating hitch 32 (FIG. 3) on the rear of the trailer 12. If there is any lateral misalignment of the dolly tongue 30 relative to a dock bumper 34, an air connector 36, dolly hook up plates 37 (FIGS. 1 and 2) and adjacent structural or accessory parts, not shown, can easily be damaged or broken. Such an event can result in considerable lost time for repairs. It should be noted that the trailer 16 is unlighted during the coupling operation, because the electrical power therefor is provided through the electrical socket 18 on the trailer 12. Thus, the second trailer has no lights which will assist the driver in effecting the coupling operation.

The conventional practice, in dimly lit areas and when the driver is operating without assistance, is to light the tail lamps and signal flashers on the trailer 12 in order to illuminate the dolly and the unlighted second trailer, and thus facilitate visual alignment by way of tractor cab mirrors 38 and 40. This has been found, in actual operation, to be less than satisfactory, as is statistically proven by the high incidence of the type of damage referred to above, and by the inordinate time such coupling operations sometimes require.

To overcome the above-outlined drawbacks to the conventional trailer and dolly coupling operation, I have advantageously utilized the existing electrical socket 18 (FIG. 3) on the trailer 12 to provide a relatively high level of illumination of the coupling components. Thus, I provide a detachable auxiliary lamp assembly 42 (FIG. 4) which is energized when plugged into the trailer socket 18 with the headlamps (not shown) of the tractor turned on.

The auxiliary lamp assembly 42 includes a tubular body 44 which encloses in fixed relation a male electrical plug 46. An index key 48 on the body 44 aligns the plug 46 by way of a mating keyway in the socket 18. In order to provide a weather-tight construction, the pins of the male plug 46 are recessed in the adjacent end of the body 44. At its other end, the body 44 flares outward to provide a conical reflector 52. Preferably, the reflector 52 has an inclined angle of at least 30° so that the rays from a bulb and socket assembly 54 provide a relatively high intensity flood lighting of the coupling area intermediate the two trailers. A suitable potting compound at 56 fixes the lamp socket in the tubular body. In order to protect the bulb, when the auxiliary lamp assembly 42 is stored in the tractor cab, the open end of the reflector 52 is provided with a wire grid 58 (FIG. 6), the central portion of which is large enough to insert or remove the bulb.

In carrying out the novel cooperation between the existing electrical socket 18 on the trailer 12 and my auxiliary lamp assembly 42, the driver plugs in and energizes the lamp assembly. The frontal area of the trailer 16 is thereby amply illuminated for the driver to accurately align the trailer 12 with the trailer 16 as he proceeds backward and first engages the dolly 14 with the trailer 12 and then pushes the dolly and its fifth wheel assembly 37 into coupled relation with the trailer 16. The driver then leaves the tractor cab and makes a visual inspection to see that the fifth wheel lock on the dolly is secure, and then hooks up the safety chain, air lines, and so forth. Finally, the lamp assembly 42 is unplugged, and substituted with the electrical plug from the second trailer, after which the lamp assembly is stored in the tractor cab and the assembled rig is ready for the road.

Illustrated in FIG. 7 is an auxiliary lamp assembly 60, which comprises a tubular body 61 having internal threads 62. Disposed within the tubular body 61 is a male plug 63 with prongs 64. An index key 65 on the body 61 aligns the plug 63 by way of a mating keyway in the socket 18.

At the opposite end of the auxiliary lamp assembly 60 is a lamp housing 66 with an outwardly flared reflector 67. Disposed within the housing 66 is a bulb and socket 68 for providing with the reflector 67 a relatively high intensity flood lighting of the coupling area between two trailers. The lamp housing 66 has a tubular body 69 with external threads 69'. A retractable, coiled, spring loaded extension cord 70 is attached at its opposite ends to the plug 63 and the tubular body 69 and comprises electrical wiring for establishing electrical connections between the plug 63 and the bulb and socket 68. A suitable clip 71 is fixed to the housing 66 for attaching the lamp assembly 60 to a convenient bracket or support.

When desired, the lamp assembly 60 may be installed as a unitary or one piece arrangement in the electrical socket 18 on the trailer 12. When this is desired, the body 69 is in threaded engagement with the body 61 and is disposed within the body 61. As an alternative arrangement, the body 61 is installed in the electrical socket 18. The body 69 is removed or separated from the body 61. The body 61 may be supported by the clips 71. The retractable extension cord 70 maintains an electrical connection between the plug 63 and the bulb and socket 68.

Illustrated in FIG. 8 is an auxiliary lamp assembly 75, which comprises a tubular body 76. Disposed within the tubular body 76 is a female plug 77 having female electrical receptacles 78. The receptacles 78 receive suitable male prongs in a suitable socket on the trailer. Such a socket can be located at the position provided for the socket 18.

At the opposite end of the auxiliary assembly 75 is a lamp housing 79 with an outwardly flared reflector 80. Disposed within the lamp housing is a bulb and socket 81 for providing with the reflector 80 a relatively high intensity flood lighting of the coupling area between two trailers. The lamp housing 79 is separable from the plug housing 76. When it is desired to join the lamp housing 79 with the plug housing 76, the housings 76 and 79 are brought into end-to-end contact or are juxtaposed. Under these conditions, the housings 76 and 79 are locked together in the joined relationship by locking clips and abutment arrangements 85.

When it is desired to install the plug housing 76 in the socket of a trailer, as above described, and detachably mount the lamp housing 79, the locking clips of the arrangements 85 are removed from their associated abutments, and the housing 79 may be mounted on any suitable location by means of a spring type lock clip 86.

For maintaining an electrical connection between the plug 77 and the socket and bulb 81, an electrical cord 90 is mounted on a spring-loaded rewind cylinder or drum 91. Thus, as the housing 79 is separated from the housing 76, the cord 90 is unwound from the drum 91 by rotating the drum 90 against the urgency of its spring. When the housing 79 is joined to the housing 76, the cord 90 rewinds on the drum 91 by the rotation thereof through the action of its spring.

I claim:

1. A detachable lamp assembly for a truck trailer and successively attachable first and second trailers, said tractor comprising an electrical power system with headlamps, said first trailer comprising a rearwardly facing electrical connector, said electrical connector being electrically connected to the electrical power system of said tractor for receiving electrical power therefrom in response to the illumination of said headlamps, said electrical connector being formed with a plurality of electrical contacts, said second trailer being electrically connected to said first trailer through said electrical connector in response to said second trailer being attached to said first trailer, said detachable lamp assembly comprising:

(a) an electrical source of light; and
(b) a lamp assembly connector connected to said electrical source of light, said lamp assembly connector being mated with at least one of said contacts of said electrical connector of said first trailer to energize said electrical source of light in response to the illumination of said headlamps.

2. A detachable lamp assembly as claimed in claim 1 and further comprising a socket for said electrical source of light, a tubular body enclosing said socket, a reflector secured to said body at the end thereof remote from said socket, said reflector and said electrical source of light providing the projection of light between said first and second trailers.

3. A detachable lamp assembly as claimed in claim 2 and further comprising locking means on the exterior of said tubular body for mating with interior locking means in the electrical connector of said first trailer.

4. A detachable lamp assembly as claimed in claim 2 wherein said tubular body includes a first housing for said lamp assembly connector and a second housing for said electrical source of light and said reflector, said second housing being separable from said first housing, and means detachably securing said second housing to said first housing.

5. A detachable lamp assembly as claimed in claim 4 and comprising extensible means interconnecting said lamp assembly connector and said electrical source of light for establishing an electrical connection therebetween.

6. A detachable lamp assembly as claimed in claim 5 wherein said extensible means comprises a retractable extension cord.

7. A detachable lamp assembly as claimed in claim 5 wherein said extensible means comprises a spring loaded drum disposed at one of said housings and an electrical cord wound on said drum, said electrical cord being unwound from said drum against the urgency of the spring of said drum and being wound around said drum under the urgency of the spring of said drum.

8. A detachable lamp assembly as claimed in claim 5 wherein said means detachably securing said second housing to said first housing comprises mating threads between said first and second housings for threaded engagement.

9. A detachable lamp assembly as claimed in claim 5 wherein said means detachably securing said second housing to said first housing comprises an interlocking clip and abutment on said first and second housings, respectively.

10. A detachable lamp assembly as claimed in claim 5 and comprising a clip on said second housing.

11. In combination:
A. a truck tractor having an electrical power system with headlamps;
B. a first trailer attached to said truck tractor, said first trailer including a rearwardly facing electrical connector, said electrical connector being electrically connected to the electrical power system of said tractor for receiving electrical power therefrom in response to the illumination of said headlamps, said electrical connector being formed with a plurality of electrical contacts;
C. a second trailer attachable to said first trailer, said second trailer being electrically connected to said first trailer through said electrical connector in response to said second trailer being attached to said first trailer; and
D. a detachable lamp assembly comprising:
 (a) an electrical source of light;
 (b) a lamp assembly connector connected to said source of light, said lamp assembly being mated with at least one of said contacts of said electrical connector of said first trailer for energizing said source of light in response to the illumination of said headlamps.

12. The combination as claimed in claim 11 wherein said detachable lamp assembly includes a socket for said electrical source of light, a tubular body enclosing said socket, and a reflector secured to said body at the end thereof remote from said socket, said reflector and said electrical source of light providing the projection of light between said first and second trailers.

13. The combination as claimed in claim 12 wherein said detachable lamp assembly further includes locking means on the exterior of said tubular body for mating with interior locking means in the electrical connector of said first trailer.

14. The combination as claimed in claim 12 wherein said tubular body includes a first housing for said lamp assembly connector and a second housing for said electrical source of light and said reflector, said second housing being separable from said first housing, and means detachably securing said second housing to said first housing.

15. The combination as claimed in claim 14 wherein said detachable lamp assembly comprises extensible means interconnecting said lamp assembly connector and said electrical source of light for establishing an electrical connection therebetween.

16. The combination as claimed in claim 15 wherein said extensible means comprises a retractable extension cord.

17. The combination as claimed in claim 15 wherein said extensible means comprises a spring loaded drum disposed at one of said housings, an electrical cord wound on said drum, said electrical cord being unwound from said drum against the urgency of the spring of said drum and being wound around said drum under the urgency of the spring of said drum.

18. The combination as claimed in claim 15 wherein said means detachably securing said second housing to said first housing comprises mating threads between said first and second housings for threaded engagement.

19. The combination as claimed in claim 15 wherein said means detachably securing said second housing to said first housing comprises an interlocking clip and abutment on said first and second housings, respectively.

20. The combination as claimed in claim 15 and comprising a clip on said second housing.

* * * * *